United States Patent Office 3,698,968

Patented Oct. 17, 1972

3,698,968

PYROTECHNIC COMPOSITION

Duane M. Johnson, Bicknell, and Donald R. Razelton, Winslow, Ind., assignors to the United States of America as represented by the Secretary of the Navy No Drawing. Filed Oct. 28, 1968, Ser. No. 772,067

Int. Cl. C06d 3/00

U.S. Cl. 149—19 3 Claims

ABSTRACT OF THE DISCLOSURE

An improved pyrotechnic composition containing potassium iodate, silver iodate, a light metal and an epoxy resin binder which upon combustion yields products which are useful in artificially modifying the weather.

GOVERNMENT INTEREST

The invention described herein may be manufactured and used by or for the government of the United States of America for governmental purposes without the payment of any royalties thereon or therefor.

BACKGROUND OF THE INVENTION

Many compositions and methods are known to the art which produce upon combustion or detonation quantities of finely divided silver iodide or silver iodide complexes which have use in artificially modifying the weather by turning undercooled clouds into ice particles for the purpose of generating rain or of preventing the formation of hail. A need exists for a composition which will efficiently produce large quantities of silver-based nuclei for use in cloud seeding. The present invention provides an improved pyrotechnic composition which produces ice freezing nuclei in greater quantities than other pyrotechnic materials presently known to the art.

SUMMARY

This invention relates to an improved pyrotechnic composition.

The general purpose is to provide a composition for pyrotechnically generating silver-based nuclei for use in turning undercooled clouds into ice particles for the purpose of generating rain. Another purpose is to provide a pyrotechnic composition which is simple and inexpensive to formulate and safe to use. The composition also provides upon combustion a smoke containing active silver-based nuclei active at temperatures up to −1° C.

Other objects, features and many attendant advantages of this invention will become readily appreciated as the same become better understood by reference to the following detailed description.

DESCRIPTION OF THE INVENTION

In accordance with the present invention an improved pyrotechnic composition is formulated which upon combustion yields smoke containing silver iodide alone and silver iodide complexes. The composition comprises silver iodate, potassium iodate, a metal selected from the group consisting of boron, aluminum, and magnesium or mixtures thereof, and an epoxy resin binder.

The following examples given in the chart below will better illustrate the invention but the invention should not be considered as limited to these examples.

All the formulations below use both silver iodate and potassium iodate except Example I wherein potassium iodate alone was used and Example XVI (the standard) potassium nitrate was used instead of potassium iodate.

| Example | Mg | Al | Si | B | $AgIO_3$ | $KIO_3$ | Epoxy binder[1] | Gilsonite[2] | Inverse burn rate, sec./in. | Nucleation efficiency |
|---|---|---|---|---|---|---|---|---|---|---|
| I | 6.3 | 14.0 | | | | 73.7 | 6.0 | | 32 | |
| II | | | 14.0 | | 24.6 | 55.7 | 5.7 | | 30 | |
| III | 6.1 | 12.7 | | | 23.1 | 52.4 | 5.7 | | 35 | |
| IV | | | | 4.8 | 26.5 | 60.7 | 8.0 | 3.0 | 10.14 | |
| V | | | | 7.8 | 25.8 | 58.4 | 8.0 | 9.0 | 13.2 | |
| VI | | | | 7.8 | 25.6 | 58.7 | 8.0 | | 5.8 | |
| VII | | | | 4.8 | 26.5 | 60.7 | 8.0 | | 12.9 | |
| VIII | 16.9 | | | | 23.5 | 53.6 | 6.0 | | | |
| IX | | | | 7.8 | 26.5 | 60.7 | 6.0 | | 3.85 | |
| X | | | | 4.8 | 26.5 | 60.7 | 6.0 | | 7.3 | |
| XI | | | | 3.0 | 26.5 | 60.7 | 6.0 | | 14.2 | |
| XII | | | | 1.5 | 26.5 | 60.7 | 6.0 | | 31.0 | |
| XIII | | | | 4.7 | 25.7 | 58.8 | 7.8 | 3.0 | | $4.1 \times 10^{12}$ at −5.5° C. |
| XIV | 16.9 | | | | 23.5 | 53.6 | 6.0 | | 4.65 | $3.6 \times 10^{12}$ at −5.9° C. |
| XV | | | | 7.8 | 25.6 | 58.7 | 8.0 | | 16.0 | |
| XVI | 8.13 | 18.04 | | | 24.09 | [3] 43.74 | 6.0 | | | $5.9 \times 10^{11}$ at −5° C. |

[1] Epoxy binder—An epoxy resin obtainable commercially which is made from the reaction product of Bisphenol A and epichlorohydrin having an epoxy equivalent weight of about 185. To this is added about 10 weight percent of butyl glycidyl ether as a reactive diluent. This material is mixed with an epoxy curing agent such as diethylene triamine.

[2] Gilsonite—a bituminous material or solidified hydrocarbons, specific gravity 1.05–1.10 (77° F.,) hardness (Mohs scale) 2, soluble in carbon disulfide.

NOTE.—Si=silicon; Mg=magnesium, atomized about 22± 8μ; Al=aluminum, about 22. ± 8μ; B=boron about 0.65μ; $AgIO_3$=silver iodate, 1.6–3.2μ; $KIO_3$=potassium iodate.

The epoxy resin used was DER321, described in Epoxy Resins by Lee and Neville, at page 19. This resin system is liquid, has an epoxide equivalent of 187–193; average molecular weight of 350–400; and has viscosity at 25° C. of 11,000–16,000 centipoises. It cures completely at 25° C. in less than 72 hours, and exhibits a low exotherm with a reasonable pot life in the present formulations. Other suitable epoxy resins may be used.

The ingredients of the above compositions were mixed using a Cowles dissolver blade—air driven. The epoxy was blended into a small amount of acetone (about 300 ml.) and the metallic fuels added and mixed for about two or three minutes. The iodates were added along with more acetone (about 1200 ml.), as needed, to maintain a slurry. The slurry was mixed at high blade speed for about five minutes. The mix was then removed and placed in an open pan in a well ventilated area and the acetone was evaporated off by blowing air across it while continuously stirring the mix. When the mix crumbled and broke up with stirring, the material was ready to be screened through a 30 mesh screen. As soon as the composition was screened it was placed in sealed containers, and is now ready for the pressing operation which should be complete within six hours from the end of the mixing cycle. The material was pressed at about 2000 p.s.i. It is very important to eliminate moisture in the final product because it produces an exothermic reaction. In the mixing procedure described above, it was found that one of the ways to eliminate the possibility of moisture is to pour the composition after it is thoroughly mixed into aluminum pans which are placed in a vacuum oven at 30° C. Under the aluminum pan is an aluminum block which acts as a heat sink. This sink holds the temperature of the composition to a minimum of about 20° C. through the drying, thus allowing the acetone to vaporize as rapidly as possible. After drying, the composition is allowed to come up to room temperature prior to removal from the oven, insuring no moisture condensation on removal of the composition from the oven. The composition may then be transferred to a sample powder tank for eventual pressing. No screen is necessary.

Nucleation efficiencies of Examples XIII, XIV and XVI were as follows (in nuclei/grams of theoretical silver iodide):

| | |
|---|---|
| (XIII) | $2.1\times10^{12}$ and $4.1\times10^{12}$ at −5.5° C. |
| (XIV) | $3.3\times10^{12}$ at −6.5° C. |
| | $3.6\times10^{12}$ at −5.9° C. |
| (XVI) | $5.9\times10^{11}$ at − 5.0° C. |
| | $1.1\times10^{12}$ at −6.0° C. |

This comparison indicates that Examples XIII and XIV using potassium iodate as an oxidizer are at least four times better than Example XVI (the standard) which does not include potassium iodate but instead uses potassium nitrate.

Hazard data on Example XIII which has a pressed density of 47.7 grams/cu in is as follows:

Impact sensitivity—56 kg. cm.
Electrostatic sensitivity—no fire at 1 joule
Friction sensitivity—no fire at 220 ft. lbs.
Ignition temperature—350° C.

Example XV which has a pressed density of 44.7 grams/cu. in. shows the following hazard data:

Impact sensitivity—53 kg. cm.
Electrostatic sensitivity—no fire at 0.9 joule
Friction sensitivity—no fire at 2240 ft. lbs.
Ignition temperature—365° C.

The use of boron in the formulation makes for a more stable pyrotechnics composition which is safer to use. The use of an epoxy resin system seems to be of definite advantage both in the mixing procedure and the consolidation procedure. The epoxy resin system wets or encapsulates the compositions much better than the Laminac system used in prior art pyrotechnic compositions. The best evidence for this is seen when the friction sensitivity of the compositions are compared. For example, the present improved compositions with the epoxy system requires 3.5 times as much frictional energy before ignition occurs than the compositions using Laminac binder. This indicates good encapsulation of the solid ingredients is occurring with the epoxy system. The epoxy resin binder system also improves the shelf life of the composition.

The suitability of the pyrotechnic compositions as cloud seeding materials has been recognized by systematic research. These compositions upon combustion form atomized by products such as silver iodide alone and the silver iodide-potassium iodide complex. In use undercooled clouds were turned into ice particles by the introduction of the finely distributed complex whereby in certain circumstances an increased rainfall is obtained. Often the pyrotechnic composition is carried in a pyrotechnic device built into an aircraft which is ferried directly into the clouds to be seeded. The pyrotechnic is ignited and the atomized cloud freezing nuclei which are formed are dispersed. Clouds are also seeded by loading rockets and artillery missiles with the pyrotechnic composition and firing them into preselected clouds.

What is claimed is:

1. A pyrotechnic composition comprising the following:

| Ingredients: | Percent by weight |
|---|---|
| Silver iodate | 23 to 30 |
| Potassium iodate | 43 to 60 |
| Boron | 1 to 8 |
| Epoxy resin | 5 to 8 |

said resin being a reaction product of Bisphenol A and epichlorohydrin to which is added butyl glycidyl ether as a reactive diluent and diethylene triamine which is a curing agent.

2. The composition of claim 1 to which gilsonite is added in an amount ranging from 3 to 9 percent by weight.

3. A pyrotechnic composition comprising
silver iodate;
potassium iodate;
a metal selected from the group consisting of silicon, boron, aluminum, magnesium and mixtures thereof; and
an epoxy resin,
which upon combustion yields a silver iodide-potassium iodide complex for use in weather modification.

References Cited

UNITED STATES PATENTS

| | | | |
|---|---|---|---|
| 2,995,526 | 8/1961 | De Ment | 252—305 |
| 3,133,841 | 5/1964 | Kuchl | 149—5 |
| 3,140,207 | 7/1964 | Williams et al. | 149—19 |
| 3,420,794 | 1/1969 | May et al. | 260—47 |
| 3,432,370 | 3/1969 | Bash et al. | 149—19 |
| 3,238,076 | 3/1966 | Taylor et al. | 149—22 |

CARL D. QUARFORTH, Primary Examiner

E. A. MILLER, Assistant Examiner

U.S. Cl. X.R.

149—22, 44, 81, 83

UNITED STATES PATENT OFFICE
CERTIFICATE OF CORRECTION

Patent No. 3,698,968 — 17 October 1972

Duane M. Johnson et al.

It is certified that error appears in the above-identified patent and that said Letters Patent are hereby corrected as shown below:

In the second inventor's name, "Razelton" should be changed to --Hazelton--.

Signed and sealed this 13th day of March 1973.

(SEAL)
Attest:

EDWARD M.FLETCHER,JR.
Attesting Officer

ROBERT GOTTSCHALK
Commissioner of Patents